United States Patent [19]
Bjorner et al.

[11] Patent Number: 5,485,263
[45] Date of Patent: Jan. 16, 1996

[54] OPTICAL PATH EQUALIZER

[75] Inventors: Johannes A. S. Bjorner, Woodbury; Steven L. Smtih, Oxford, both of Conn.

[73] Assignee: United Parcel Service of America, Inc., Atlanta, Ga.

[21] Appl. No.: 292,400

[22] Filed: Aug. 18, 1994

[51] Int. Cl.⁶ ........................................... G01C 3/08
[52] U.S. Cl. .................. 356/4.01; 359/212; 359/223; 358/494
[58] Field of Search .................... 359/196, 212, 359/220, 221, 223; 358/494; 356/4.01

[56] References Cited

U.S. PATENT DOCUMENTS

| | | |
|---|---|---|
| 3,617,105 | 11/1971 | Konrad .......................................... 350/6 |
| 3,797,908 | 3/1974 | Ward et al. ................................... 350/7 |
| 4,136,821 | 1/1979 | Sugiura et al. . |
| 4,877,949 | 10/1989 | Danielson et al. . |
| 5,064,259 | 11/1991 | Frank .......................................... 350/6.5 |
| 5,185,822 | 2/1993 | Miura . |
| 5,216,230 | 6/1993 | Nakazawa . |
| 5,308,966 | 5/1994 | Danielson et al. . |

*Primary Examiner*—Mark Hellner
*Attorney, Agent, or Firm*—Jones & Askew

[57] ABSTRACT

An optical system for adjusting the optical path between a detector and an object, such as an information-encoded label affixed to a package. The optical system comprises a pair of movable mirrors and an array of fixed mirrors. One of the movable mirrors is positionable to direct an image reflected from the object to any one of the array of fixed mirrors. The other of the movable mirrors is positionable to direct the image reflected by the fixed mirror to the detector. The positions of the movable mirrors are adjusted responsive to variations in the measured height of different objects.

27 Claims, 5 Drawing Sheets

OPTICAL PATH EQUALIZER

TECHNICAL FIELD

The present invention relates generally to optical systems, and in particular to an optical system for equalizing the optical path length between an over the belt camera and a moving object having alpha-numeric or optically encoded information on the surface.

BACKGROUND OF THE INVENTION

In recent years, the use of readers which are adapted to optically read labels containing alpha-numeric or encoded information, such as bar codes and two dimensional symbologies, has become widespread. Traditional bar code readers, such as the familiar scanning devices used in many grocery stores, operate by scanning with a laser beam the surface of an object on which the bar code is formed. The image that is reflected from the code surface is received by a light sensing element and converted into a binary signal corresponding to the information contained in the label or bar code.

The growth in the use of code readers has been particularly strong in the parcel delivery industry, where information is printed on labels affixed to merchandise, packages, letters, moving objects and other items being shipped or transported. Modem optically-readable labels, such as the one described in U.S. Pat. No. 4,874,936 to Chandler et al., and which is incorporated herein by reference, comprise two-dimensional symbologies to provide a much higher information-density than conventional bar codes. Typically the encoded information on these labels includes information regarding origin, flight number, destination, name, price, part number, etc. Two-dimensional encoded labels are also widely used for automated routing and sorting of mail, parcels, baggage, etc.

In order to read the alpha-numeric and/or encoded labels, the parcel delivery industry commonly uses "over the belt" camera systems, in which overhead cameras create images of bar code labels or the like on packages traveling on conveyor belts below the camera. Typically these camera systems utilize charge-coupled device ("CCD") cameras to produce such images. Modem over the belt camera systems have conveyor belt widths of one and a half feet to five feet to accommodate packages of varying sizes and shapes, and belt speeds of up to five hundred feet per minute.

In order to read and create images of labels containing alpha-numeric or encoded symbologies, the over the belt camera system must be able to focus on the label as it rapidly passes on the conveyor belt. Packages traveling on the conveyor belt will be of varying heights, so the distance between the label and the: camera sensing element may vary significantly. Often the height of the packages will vary to such an extent that the label falls outside of the camera's depth of field, thereby preventing the optical decoding system from focusing on the label.

A camera in a typical "over the belt" reader system operates by taking "slices" of the image of the label as the object passes below on the conveyor belt. It will be appreciated that the width of the image is determined by the field of view across the belt, while the length of the image is determined by the velocity of the belt. The "aspect ratio" is defined as the ratio of the height of the image to the width of the image. In order to prevent the image from becoming distorted, it is important that the aspect ratio be kept constant. However, if the object-to-detector distance varies while the belt speed remains constant, only the width of the image changes, and the image becomes distorted.

The difficulty in maintaining a focused image has led to the development of various autofocusing techniques. One conventional method of autofocusing is disclosed in U.S. Pat. No. 4,877,949 to Danielson et al. In this method, the focusing lens of the camera is moved by a motor to maintain the image and focus. However, changing the front or back focal length to refocus as the distance between the label and the camera changes has the drawback that the magnification changes when the refocusing occurs. That is, the closer the encoded label is to the sensing element of the camera, the larger the image size appears. In addition, moving the focusing lens does not compensate for the change in aspect ratio, permitting distortion of the image. This approach has proven unsuitable for use in situations where the distance between the object and the sensing element varies greatly.

U.S. Pat. No. 5,308,966 to Danielson et al. discloses an optical system comprising a plurality of mirrors arranged at different distances to provide multiple optical paths between a hand-held bar code reader and a label. This system, however, requires a separate image sensor to be placed in each of the multiple optical paths.

Another conventional method of autofocusing relies on physically moving the position of the camera to compensate for varying object heights. This method is limited by the need to overcome the inertia of the camera in its linear motion, and permits changes in the aspect ratio.

According to yet another prior method directed to a similar problem, the optical path length between a light source and an object is varied in order to compensate for varying reading distances. In this technique, as described in U.S. Pat. No. 5,216,230 to Nakazawa, a reflecting mirror is moved into and out of the optical path between the light source and the object in order to provide two different optical path lengths. Additional reflecting mirrors may be arranged to be moved into and out of the optical path in order to provide additional optical path lengths. However, because this method requires multiple mechanical arrangements for driving the reflecting mirrors into and out of the optical path, this technique is unsuitable for providing a multiplicity of optical path lengths.

U.S. Pat. No. 5,185,822 to Miura describes an automatic sorting system for objects on a conveyor. In order to focus a camera on objects of differing sizes, the system translates a pair of reflecting mirrors along the optical path between a light source and the object. It appears this system would require parts made with a very high degree of precision to assure that the mirrors would stay in alignment as they were being moved.

Therefore, there is a need for an optical system that ensures that the image of a label is not distorted by maintaining a substantially constant aspect ratio as the distance between the camera and the label changes.

There is also a need for an autofocusing system in which the size of the image of a label remains substantially constant despite changes in the distance between the camera creating the image and the label.

There is also a need for an optical system that equalizes the optical path length between a camera and an object without changing the focusing optics or the camera position.

There is also a need for an optical system that provides a plurality of optical path lengths between a camera and an object and that does not require the use of multiple image sensors.

Furthermore, there is a need for an optical path equalizer that avoids the need for multiple camera sensors or multiple lens systems.

SUMMARY OF THE INVENTION

Briefly described, the present invention provides an optical system for adjusting the optical path length between a detector and an object, such as an alpha-numeric or information-encoded label affixed to a package. According to one aspect of the invention, the optical system comprises a pair of movable mirrors and an array of path defining mirrors, which preferably comprises a row of fixed mirrors. One of the movable mirrors is positionable to direct an image reflected from the object to any one of the array of path defining mirrors. The other of the movable mirrors is positionable to direct the image reflected by the path defining mirror to the detector.

A system according to the invention maintains the object-to-detector distance within the detector's depth of field to stabilize the aspect ratio of the image despite changes in the dimensions of the object. As a result, the acquired image is undistorted as well as in focus.

According to another aspect of the invention, a height sensor is provided to measure a distance related to the height of the object. In order to compensate for variances in the height of the object, the optical system is operative responsive to the height sensor to adjust the optical path length between the detector and the object by manipulating the positions of the movable mirrors to select a different optical path length. Preferably, the optical path length selected is within the depth of field of the detector.

According to yet another aspect of the invention, the optical system comprises a plurality of mirrors arranged in two parallel rows. The first row of mirrors is spaced apart from and parallel to the second row of mirrors. A selected first mirror from the first row of mirrors and a selected second mirror from the second row of mirrors are pivoted to provide an optical path between the object and the detector. Thus, a light beam reflected off of the object will be directed to the first mirror, then to the second mirror, and then to the detector.

According to yet another aspect of the invention, a method is provided for adjusting the optical path length between a detector and an object. The method comprises the steps of reflecting an image off of the object to a first movable mirror and directing the image to a selected one of an array of path defining mirrors. From the selected one of the array of path defining mirrors, the image to a reflected to a second movable mirror. The image is then reflected from the second movable mirror to the detector. The positions of the first and second movable mirrors are adjusted to select a different one of the array of path defining mirrors to provide a different optical path length between the detector and the object.

It should be appreciated that the invention can be applied in the acquisition of any image, whether the subject be text, a symbology, graphics, or a two-dimensional or three-dimensional object.

Therefore, it is an object of the present invention to provide an optical system for reading alpha-numeric data or encoded labels on moving objects that vary in height.

A further object of the present invention is to equalize the optical path length between a camera and a series of objects of differing height.

It is also an object of the present invention to adjust the optical path length between a camera and an object without changing the focusing optics or the camera position.

A further object of the present invention is to adjust mirrors in the optical path length between a series of objects and an imaging camera so that the optical path length always falls within the depth of field of the camera optics despite changes in the height of the objects.

Further objects and advantages of the invention will become apparent from the description of the invention which follows.

DETAILED DESCRIPTION OF THE PREFERRED EMBODIMENTS

Figure 1:
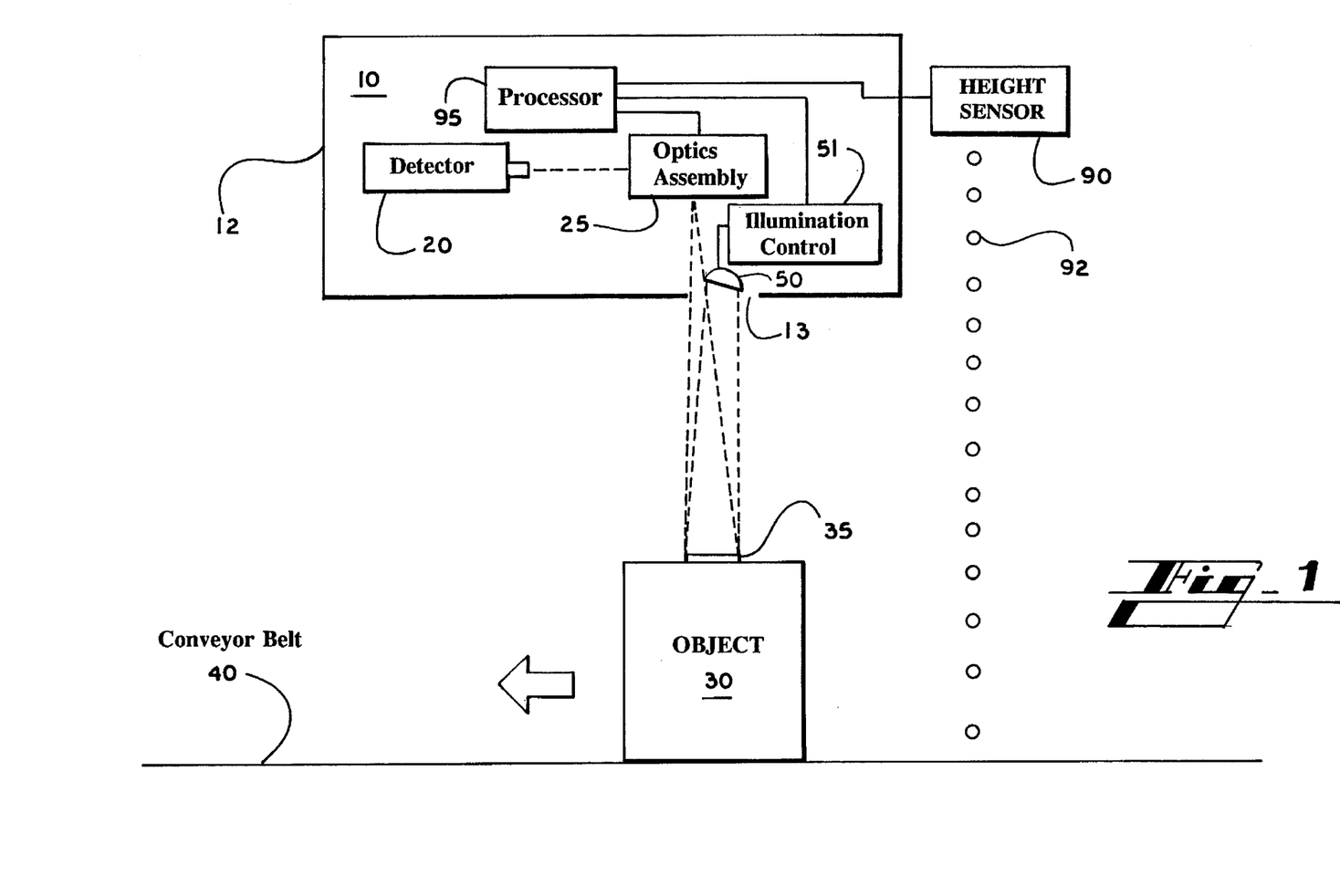
FIG. 1 is a block diagram illustrating the basic arrangement of an over the belt camera system constructed in accordance with the present invention.

Turning to the drawing figures in which like numbers reference like parts or steps, the preferred embodiments of the present invention will now be described. FIG. 1 is a block diagram illustrating the basic arrangement of an over the belt camera system constructed in accordance with the present invention. Optical reader system 10, positioned over conveyor belt 40 and within housing 12, comprises a detector 20, an optics assembly 25, and processor 95. Processor 95, which may alternatively be located outside of the housing 12, is interfaced with illumination control 51 which controls a light source 50. Illumination control 51 and light source 50 may also be positioned outside of housing 12. Housing 12 includes an aperture 13 through which light may pass from the light source 50 towards the conveyor belt 40.

Optical system 10 is operative to detect and read an alpha-numeric or information-encoded label 35, such as a bar code or a two-dimensional symbology. Encoded label 35 is affixed to a moving object 30 that is transported beneath optical system 10 by conveyor belt 40. Optical system 10 is interfaced with height sensor 90, which measures the height of objects 30 before reaching optical system 10.

Figure 2:
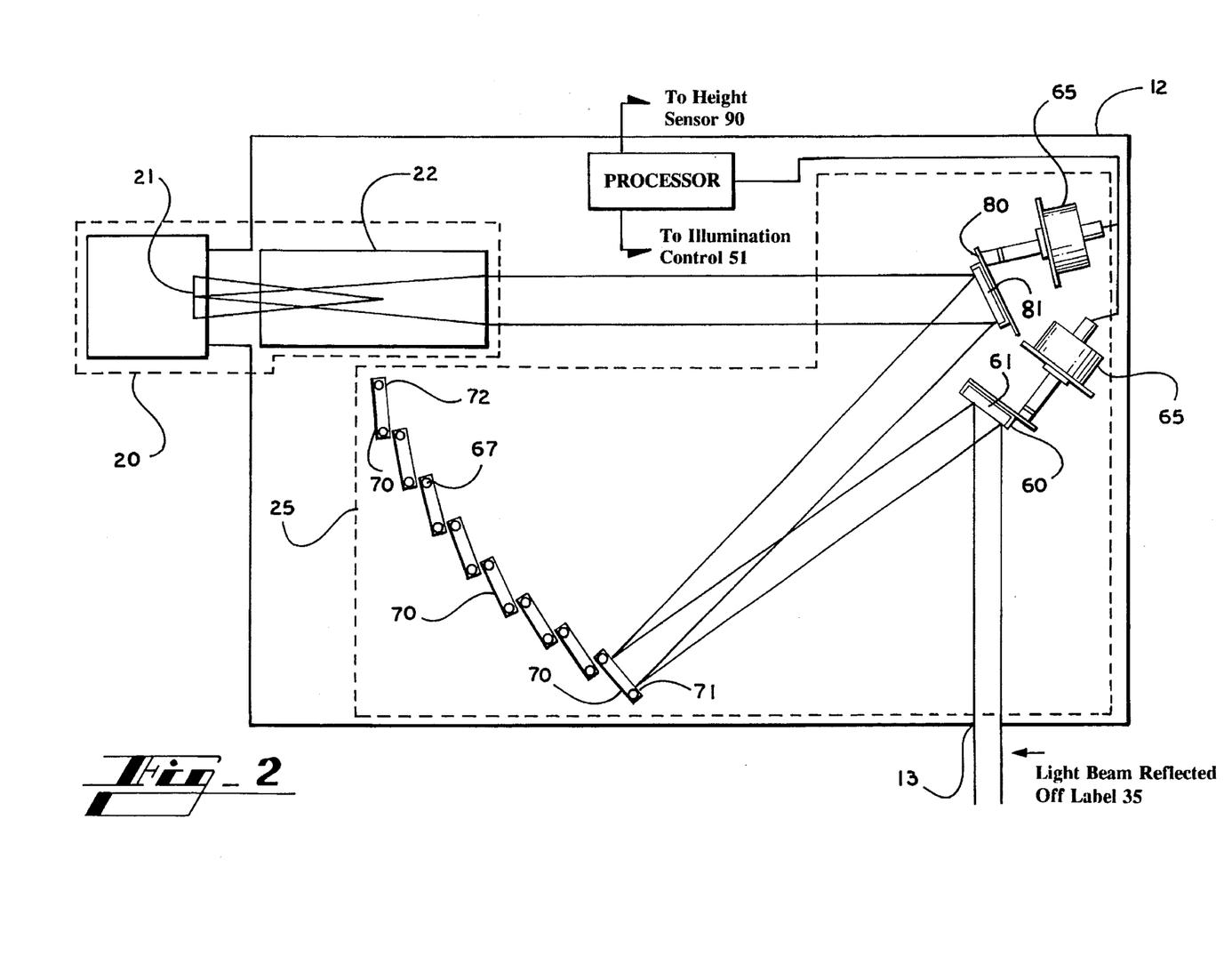
FIG. 2 is a schematic diagram of a first preferred embodiment of the optics assembly of the camera system shown in FIG. 1.

In the preferred embodiment, detector 20 is a charge-coupled device ("CCD") camera adapted to create an image of label 35. As shown in FIG. 2, detector 20 comprises a CCD sensor 21 disposed at the focusing position of a lens 22. The distance between the sensor 21 and the lens 22 is held constant to provide a fixed focal point. The sensor 21 may be of a line sensor or area sensor type. It will be appreciated that camera 20 will have a certain "depth of field", i.e., a range of distances over which the camera gives satisfactory definition, with the focusing lens 22 in the best focus for a certain specific distance. The operation of CCD cameras to create images of encoded labels, particularly in over the belt camera systems, is well known to those skilled in the art, and is described in detail in the Chandler et al. patent referenced above.

Conveyor belt 40 is provided to accommodate and transport objects 30 of varying shapes and sizes. Objects 30 preferably comprise merchandise, packages, letters, or the like that may be shipped or transported, but may also include any other items to which information-encoded labels may be attached.

Light source 50 is preferably a high intensity light source, which will reflect well based on the optical properties of the label 35. The light may be infrared, ultraviolet or visible light, and the light spectrum of visible light may vary. The light source 50 must produce enough reflected light at the CCD sensor 21 to reliably decode the label 35. A laser light source passed through a suitable optical system to provide a line source of illumination could also be used in the practice of this invention, as could non-laser light sources.

Thus, as encoded label 35 is moved by conveyor belt 40, the height of object 30 is measured by height sensor 90, which is described in more detail below. When the label 35 is below the aperture 13 of the optical system housing 12, light is emitted onto label 35 by light source 50. The label 35 is then scanned by detector 20 to provide electrical signals representative of the light reflected off label 35. If sensor 21 is designed as a line sensor, a plurality of sensors composed of CCD elements or the like are arrayed in a direction perpendicular to the movement of object 30 formed by the lens 22. The information-encoded label 35 is scanned line by line as the object 30 moves.

If sensor 21 is designed as an area sensor, the entire information-encoded label 35 can be read at one time. Either type of sensor 21 may be selected according to the specific use of the optical system. The manner of converting the light that is reflected from the label surface 35 into a binary signal corresponding to the encoded information is well known to those skilled in the art.

FIG. 2 is a schematic diagram illustrating the basic arrangement and operation of a first preferred embodiment of the optics assembly 25. Optics assembly 25 comprises a pair of movable mirrors 60 and 80 and an array of fixed mirrors 70. Movable mirrors 60 and 80 are pivotally mounted to the housing 12 on pivot pins 61 and 81, respectively. The movable mirrors 60 and 80 are rotated by one or more actuators 65 which may be conventional step motors or other actuators which are well known in the art. In the preferred embodiment, the movable mirrors 60 and 80 are moved by HSI Series 46000 bidirectional linear stepper motors, manufactured by HSI. The 46000 Series for example No. 46448-05001, utilizes a sub-fractional horsepower stepper motor which incorporates a threaded rotor in conjunction with a lead screw shaft to provide rapid movement in an outward and an inward direction, followed by rapid deceleration.

The array of fixed mirrors 70 comprises a plurality of mirrors positioned at increasing distances from the movable mirrors so as to provide a plurality of different optical path lengths between detector 20 and object 30. Therefore, the array of fixed mirrors 70 are also referred to as "path defining mirrors". The array of fixed mirrors 70 are attached to the housing 12 by a pair of brackets 67 at both sides of the housing 12.

The first movable mirror 60 is selectably positionable to receive an image of the label 35 reflected off of the object 30 and to reflect the image to a selected one of the array of fixed mirrors 70. The second movable mirror 80 is selectably positionable to receive the image reflected from the selected one of the array of fixed mirrors 70 and to reflect the image to detector 20.

Therefore, in the embodiment shown in FIG. 2, the optical path length between detector 20 and label 35 is defined by the path from the label 35 to the first movable mirror 60, to a selected one of the array of fixed mirrors 70, to the second movable mirror 80, and finally to detector 20. Accordingly, it will be appreciated that by manipulating the positions of movable mirrors 60 and 80, it is possible to select among the plurality of fixed mirrors 70 to provide different optical path lengths. Preferably the selection among the plurality of fixed mirrors 70 is made to provide an optical path length that is within the depth of field of the detector 20.

For example, in FIG. 2, movable mirrors 60 and 80 may be positioned to provide a first optical path length from label 35 to first movable mirror 60, to fixed mirror 71, to second movable mirror 80, and to detector 20. By rotating the positions of movable mirrors 60 and 80, a different optical path length may be selected. For example, movable mirrors 60 and 80 may be positioned to provide a second optical path length from label 35 to first movable mirror 60, to fixed mirror 72, to second movable mirror 80, and to detector 20. The number of different optical path lengths which may be selected is thus determined by the number of mirrors in the fixed array 70.

Isolation mounts, such as ISOLOSS sandwich mounts made by E-A-R Specialty Composites, may be coupled between movable mirrors 70 and the linear actuators 65. Such mounts include highly damped urethane elastomers which isolate the components from vibration and shock and provide controlled deceleration.

Optical system 10 is adapted to detect and read labels 35 disposed on moving objects 30 that vary widely in size and shape. For example, one object 30 may comprise a standard letter envelope while the next object 30 may be a larger package. In the preferred embodiment, the optical system 10 is adapted to read objects that vary in height as much as 8 inches, but this range may be even greater depending on the number of mirrors in the fixed array 70 and the depth of field of the detector 20. Therefore, the height of different objects 30 will vary significantly. Because the distance between detector 20 and encoded label 35 is a function of the height of object 30, a change in the height of object 30 will also correspond to a change in the distance.

Furthermore, it will be appreciated that as the distance between detector 20 and object 30 changes, the size of the label image created by detector 20 will also tend to change due to magnification. That is, the closer the label 35 is to the detector 30, the larger the image size appears. For quality detection needed for reliable decoding, however, it is important that the image size of the label 35 remain relatively constant despite variances in the distance between the detector 20 and the label 35.

In the preferred embodiment, optical system 10 maintains a constant image size by adjusting the optical path length between detector 20 and label 35. In particular, the optical path length is adjusted by manipulating the positions of movable mirrors 60 and 80. Unlike prior systems, however, which require that multiple mirrors be moved into and out of the optical path in order to provide additional path lengths, the preferred embodiment provides a plurality of optical path lengths by rotating movable mirrors 60 and 80 to select one of the array of path defining mirrors 70.

Because the particular optical path length selected by optical system 10 is related to the height of object 30, height sensing device 90 is provided to measure the height of object 30. Alternatively, height sensing device 90 may be adapted to measure any distance related to the height of object 30, for example, the distance from detector 20 to the top surface of moving object 30. Height sensing device 90 may be any conventional height measuring device, such as a light curtain 92 generated by a vertical array of light sources.

Alternatively, the height may be measured by reflecting ultrasonic or infrared waves from top of the object 30 and measuring the time that it takes to detect the reflected waves. The measured time can then be converted into the distance between the object 30 and a fixed reference point. The use of light curtains and ultrasonic waves or the like to measure the size of an object or distances is well known to those skilled in the art.

The height information from height sensing device 90 is applied to processor 95. In the preferred embodiment, processor 95 is a type 80486 microcomputer circuit, manufactured by Intel Corporation of Santa Clara, Calif., or any suitable processor card, and is programmed to relate the measured height of object 30 to the positions of movable minors 60 and 80. Therefore, based upon the height measurement, the positions of movable mirrors 60 and 80 are adjusted by actuators; 65 under control of the processor 95.

In the preferred embodiment, as the height of object 30 changes, the positions of movable mirrors 60 and 80 are adjusted to achieve a constant relative optical path length between the detector 20 and label 35. That is, as the height of object 30 increases, the positions of movable mirrors 60 and 80 will be adjusted to increase the optical path length to compensate for the corresponding decrease in the distance between detector 20 and label 35. Preferably, the positions of the mirrors 60 and 80 are adjusted to provide an optical path length that is within the depth of field of the detector 20.

In the same manner, if the height of the next object 30 is smaller than the height of the first object, then the positions of the movable mirrors 60 and 80 will be adjusted to decrease the optical path length to compensate for the corresponding increase in the distance between detector 20 and label 35.

Figure 3:
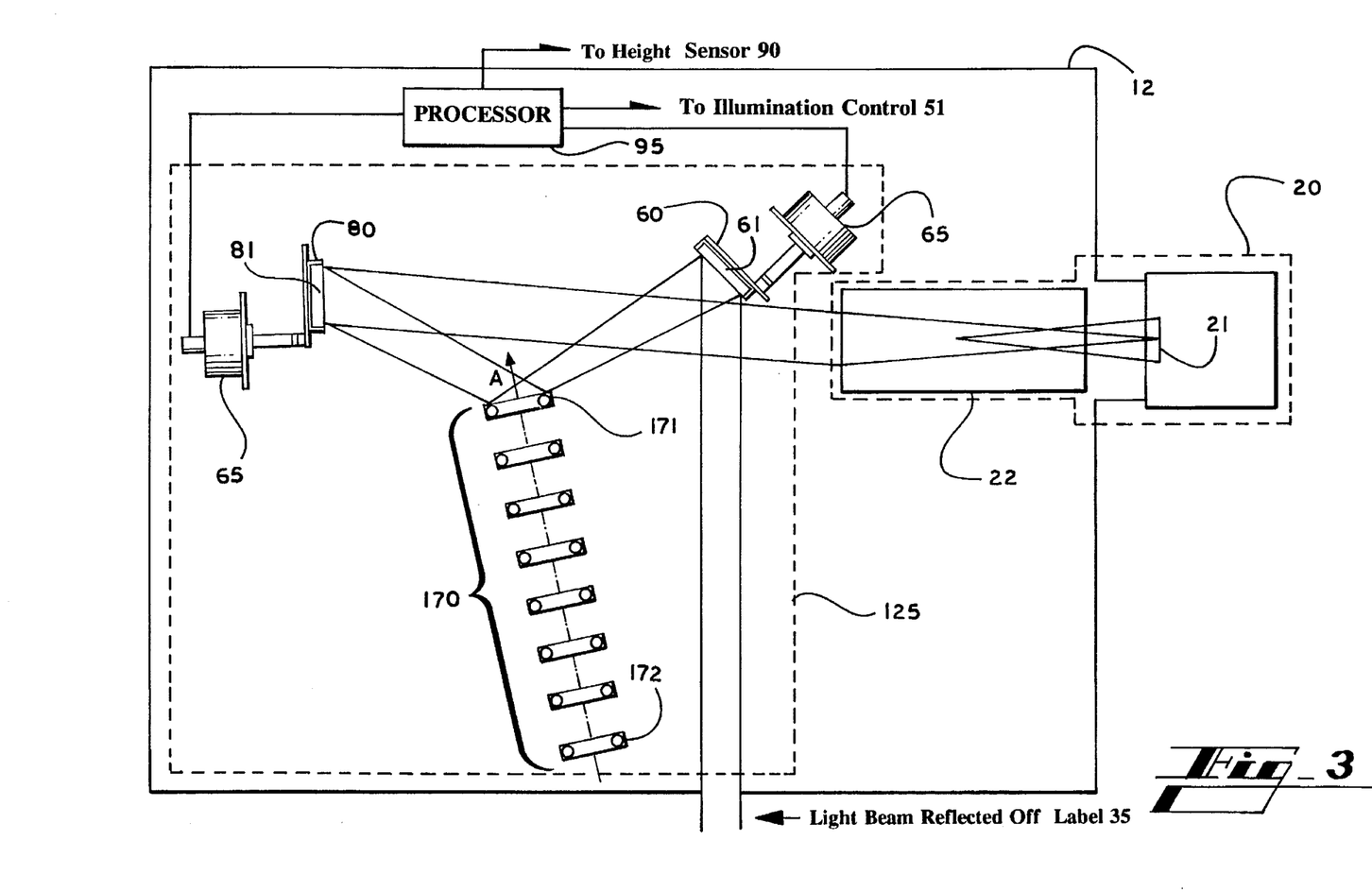
FIG. 3 is a schematic diagram of a second preferred embodiment of the optics assembly shown in FIG. 1.

FIG. 3 is a schematic diagram illustrating a second preferred embodiment of the optics assembly 125, which operates in the same manner as the first preferred embodiment. In this second embodiment, an array of fixed mirrors 170 is interposed between movable mirrors 60 and 80. The mirrors of the array of fixed mirrors 170 are positioned spaced apart along and perpendicular to an axis A. Axis A is preferably along a line equidistant between the position of first movable mirror 60 and second movable mirror 80.

First movable mirror 60 is selectably positionable to receive an image of label 35, created by light reflected from light source 50 off of object 30, and to reflect the image to a selected one of the array of fixed mirrors 170. From the selected one of the array of fixed mirrors 170, the image is reflected off second movable mirror 80. The second movable mirror 80 is selectably positionable to receive the image from the selected one of the array of fixed mirrors 170 and to reflect the image to detector 20. It will therefore be appreciated that the array of fixed mirrors 170 provides a plurality of different optical path lengths between the detector 20 and the object 30.

As in the first embodiment, the positions of movable mirrors 60 and 80 in the second embodiment are adjusted to select among the plurality of different optical path lengths. For example, in FIG. 2, movable mirrors 60 and 80 may be positioned to provide a first optical path length from label 35 to first movable mirror 60, to fixed mirror 171, to second movable mirror 80, and to detector 20. By rotating the positions of movable mirrors 60 and 80, a different optical path length may be selected. For example, movable mirrors 60 and 80 may be positioned to provide a second optical path length from label 35 to first movable mirror 60, to fixed mirror 172, to second movable mirror 80, and to detector 20. The number of different optical path lengths which may be selected is thus determined by the number of mirrors in the fixed array 170.

With the exception of the arrangement of the array of fixed mirrors 170, the second embodiment operates in the same manner as the: first embodiment. That is, the height of object 30 is measured by height sensing device 90 and provided to processor 95. Processor 95 then signals actuators 65 to adjust the positions of movable mirrors 60 and 80 according to the height measurement in order to maintain a relatively constant optical path length as objects of differing height pass beneath the reader 10. Preferably, the positions of the mirrors 60 and 80 are adjusted to provide an optical path length that is within the depth of field of the detector 20.

Figure 4:
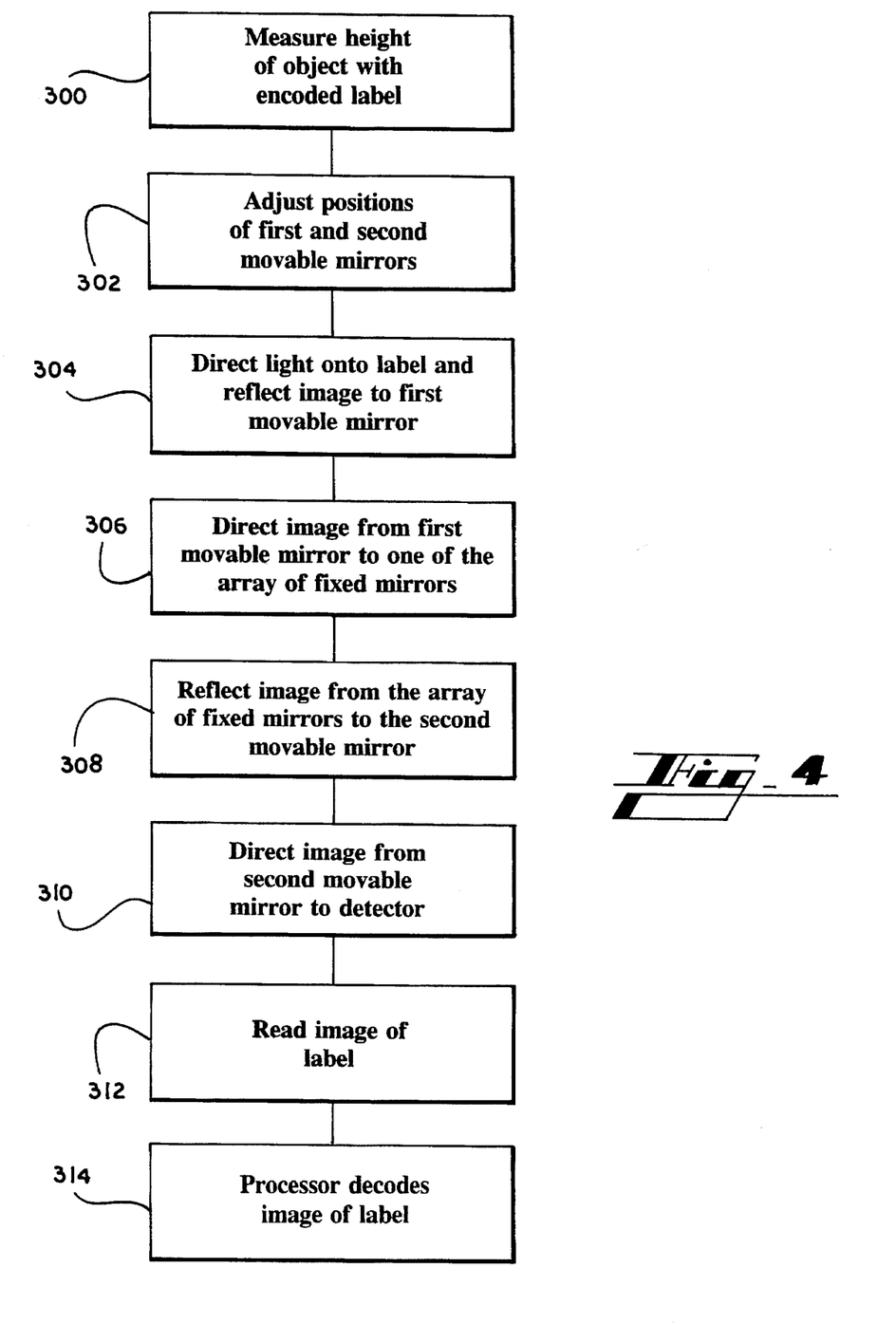
FIG. 4 is a flow chart illustrating the basic operation of the first and second embodiments of the present invention.

FIG. 4 is a simplified flow chart illustrating the operation of the first and second embodiments of the present invention. At step 300, the height of the object having a label affixed thereon is measured. At step 302, the positions of the first and second movable mirrors are adjusted responsive to the measured height of the object. At step 304, a light source directs light onto the label, and an image of the label is reflected to the first movable mirror.

The image is directed at step 306 from the first movable mirror to a selected one of the array of fixed mirrors. At step 308, the image is reflected from the array of fixed mirrors to the second movable mirror. The image is then directed to the detector at step 310. At step 312, the detector reads the image of the label. At step 314, the processor decodes the information contained in the label image.

Figure 5:
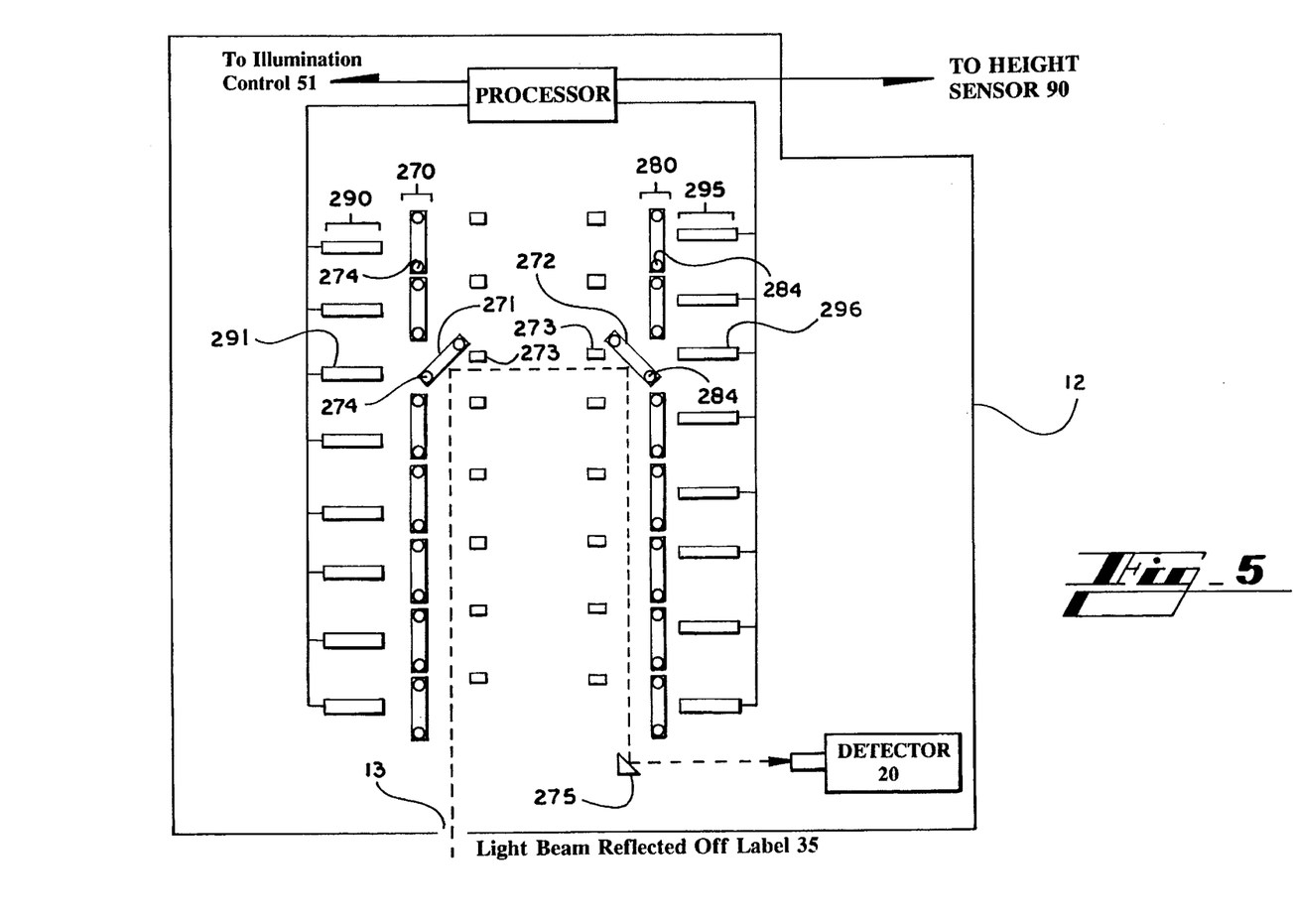
FIG. 5 is a schematic diagram of a third preferred embodiment of the optics assembly shown in FIG. 1.

FIG. 5 is a schematic diagram illustrating the basic arrangement and operation of a third embodiment of the optics assembly 225. The operation of the third embodiment is similar to the operation of the first and second embodiments as described above in that the system maintains a constant image size by adjusting the, optical path length between the detector 20 and the label 35 to compensate for variances in the height of object 30. In the third embodiment, however, the plurality of different optical path lengths is provided by pivoting corresponding pairs of movable mirrors from two parallel rows of movable mirrors.

In particular, optical system 210 comprises a first and second row of movable mirrors 270 and 280. The first row of movable mirrors 270 is positioned apart from and parallel to the second row 2.80. The first and second rows of movable mirrors 270 and 280 each comprise a plurality of reflecting mirrors aligned end to end in a row such that each individual mirror is capable of rotating or pivoting independently from the other mirrors within the same row.

In this third embodiment, the first and second rows of movable mirrors 270 and 280 are controlled by a pair of corresponding rows of electromagnets 290 and 295. Each mirror is mounted on a ferromagnetic metal casing which is pivotally mounted to the housing 12 by pivot pins 274 and 284, respectively. Thus each of the individual mirrors in rows 270 and 280 is pivoted by activating its corresponding electromagnet. For example, movable mirror 271 is pivoted by activating electromagnet 291, and movable mirror 272 is pivoted by activating electromagnet 296. The mirrors may also be pivoted by any suitable actuator, for example, solenoids or step motors.

Preferably, the pair of movable mirrors are pivoted 45° inwardly with respect to one another. In FIG. 5, for example, mirrors 271 and 272 have each been pivoted 45° inwardly with respect to one another. Stops 273 extending from the housing 12 are provided for each mirror in the two rows 270 and 280. The stops 273 are positioned such that each associated mirror will pivot to the 45° position and remain against the stop 273 under the electromagnetic force.

The light source 50 is positioned to direct light to a label such that the image of the label is reflected upward between the rows of mirrors 270 and 280 to strike mirror 271. Mirror 272 is positioned to receive the image from mirror 271 and reflect the image back down through the rows of mirrors. A right angled mirror 275 is provided to receive the image from the pivoted mirror 272 in the second row of movable mirrors 280 and to reflect the image to the detector 20.

Thus, a plurality of different optical paths between object 30 and detector 20 are provided by pivoting a selected mirror from the first row of movable mirrors 270 and by pivoting the corresponding mirror from the second row of movable mirrors 280. The number of different optical path lengths which may be selected is determined by the number of mirrors in the first and second row of movable mirrors 270 and 280.

As in the first and second embodiments, the particular optical path length selected in the third embodiment is a function of the height of object 30. Therefore, processor 95 is provided to receive the measured height of object 30 from height sensing device 90 and to determine an appropriate optical path length corresponding to that height. Thus, based upon the measured height of object 30, the processor 95 is operative to activate a selected pair of electromagnets, one from the first row of electromagnets 290 and the other from the second row of electromagnets 280. Activating the selected pair of electromagnets thereby causes the corresponding pair of movable mirrors to pivot 45° inwardly with respect to one another so as to create an optical path between the label 35 and the detector 20.

Thus as the height of object 30 changes, a particular pair of movable mirrors are selected, one from the first row 270 and the other from the second row 280, so as to provide a relatively constant optical path length between the label 35 and the detector 20. Preferably, the optical path length chosen is within the depth of field of the detector 20.

In view of the foregoing, it will be understood that the present invention provides an optical reader system for reading encoded labels on moving objects that vary in height. The optical reader system is operative to equalize the optical path length between a camera and a moving object without changing the focusing optics or the camera position. Mirrors in the optical path length are adjusted so that the optical path length always falls within the depth of field of the camera optics despite changes in the height of the objects. Thus, the present invention avoids the need for multiple camera sensors or multiple lens systems.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing discussion.

What is claimed is:

1. An optical system for adjusting the optical path length between a detector and a label affixed to a package, said optical system comprising:

a pair of movable mirrors; and an array of path defining mirrors;

one of said movable mirrors being positionable to direct an image reflected from the label to any one of said array of path defining mirrors and the other of said movable mirrors being positionable to direct the image reflected by said one of said array of path defining mirrors to the detector.

2. The apparatus of claim 1, wherein said label includes optically encoded symbology.

3. The apparatus of claim 1, wherein said label includes alpha-numeric characters.

4. The apparatus of claim 3, wherein said detector is an over the belt camera capable of imaging and decoding the alpha-numeric characters.

5. The apparatus of claim 1, wherein said array of path defining mirrors comprises a row of fixed mirrors; and wherein said movable mirrors are pivotally mounted so as to direct the image at any one of said fixed mirrors.

6. The apparatus of claim 5, wherein said fixed mirrors are positioned to define a plurality of different optical path lengths between the label and the detector.

7. The apparatus of claim 5, wherein said array of path defining mirrors is positioned along and perpendicular to a line extending equidistant between the positions of said pair of movable mirrors.

8. The apparatus of claim 1, further comprising:

a conveyor system for carrying a plurality of objects;

a height sensor for measuring a distance relating to the heights of the plurality of objects; and a processor responsive to said height sensor to adjust the positions of said pair of movable mirrors.

9. An optical reader comprising:

an optical detector;

a light source:

an object reflecting light from said light source an optical system defining an optical path between the object and the optical detector, comprising:
a pair of movable mirrors; and
an array of path defining mirrors;

one of said movable mirrors being positionable to direct light reflected from the object to any one of said array of path defining mirrors and the other of said movable mirrors being positionable to direct light reflected by said one of said array of path defining mirrors to the detector.

10. The optical reader of claim 9, wherein: said object carries optically encoded symbology.

11. The optical reader of claim 10, further comprising a decoding device connected to receive signals from said detector, said signals being responsive to reflected light.

12. The optical reader of claim 9, further comprising:

a conveyor system for carrying a plurality of objects past said optical detector;

a height sensor positioned to measure a distance relating to the height of the object; and a controller for adjusting the positions of said movable mirrors responsive to the distance relating to the height of the object.

13. The optical reader of claim 12, wherein said controller comprises:

a processor connected to receive a height signal representing said distance and to output a path length signal; and a plurality of mirror activators each operatively associated with one of said movable mirrors to adjust the positions of said movable mirrors responsive to said path length signal.

14. The optical reader of claim 13, wherein said plurality of mirror activators comprises a plurality of bidirectional linear stepper motors.

15. An optical system for adjusting the optical path length between a detector and an object, said optical system comprising:

means for measuring a distance relating to the height of the object;

first and second movable mirrors interposed between the object and the detector;

an array of path defining mirrors positioned to provide a plurality of selectable optical path lengths from the object to said first movable mirror to a selected one of said array of path defining mirrors to said second movable mirror to the detector; and means, responsive to said measuring means, for adjusting the position of said first and second movable mirrors so as to select one of the plurality of selectable optical path lengths.

16. An optical system for adjusting the optical path length between a detector and an object, said optical system comprising:

means for measuring a distance relating to the height of the object;

a plurality of mirrors arranged in a first and second row such that the first row is spaced apart from and parallel to the second row;

means, responsive to said measuring means, for pivoting a selected first mirror from the first row of said plurality of mirrors and a selected second mirror from the second row of said plurality of mirrors;

wherein the selected first and second mirrors are pivoted such that a light beam reflected off of the object will be directed to the first mirror to the second mirror to the detector.

17. The optical system of claim 16, wherein said means for pivoting comprises a plurality of electromagnets corresponding to said plurality of mirrors; and wherein each electromagnet is operative when activated to pivot its corresponding mirror.

18. A method for adjusting the optical path length between a detector and an object, said method comprising the steps of:

reflecting an image off of the object to a first movable mirror;

directing the image from the first movable mirror to a selected one of an array of path defining mirrors;

reflecting the image from the selected one of the array of path defining mirrors to a second movable mirror;

directing the image from the second movable mirror to the detector; and adjusting the position of the first and second movable mirrors so as to select a different one of the array of path defining mirrors to provide a different optical path length between the detector and the object.

19. The method of claim 18, further comprising the step of measuring the height of the object, said adjusting step being responsive to the height of the object.

20. The method of claim 19, further comprising:

conveying a sequence of objects through a light beam; and wherein said adjusting step comprises adjusting said first and second movable mirrors to maintain said optical path length relatively constant despite differences in the height of said objects.

21. The optical reader of claim 9, further comprising a conveyor moving said object relative to said light source.

22. The optical reader of claim 21, further comprising a single lens system positioned along said optical path, said movable mirrors being positionable to direct light reflected from said object to any of said path defining mirrors and to said lens system.

23. The optical reader of claim 9, wherein said object is positioned at one end of said optical path.

24. The optical reader of claim 9, wherein said array of path defining mirrors is positioned to define a plurality of different optical path lengths between said object and said detector.

25. A method for adjusting the optical path length between a detector an a label affixed to a package, said method comprising the steps of:

reflecting an image off of the label to a first movable mirror;

directing the image from the first movable mirror to a selected one of an array of path defining mirrors;

reflecting the image from the selected one of the array of path defining mirrors to a second movable mirror;

directing the image from the second movable mirror to the detector; and adjusting the position of the first and second movable mirrors so as to select a different one of the array of path defining mirrors to provide a different optical path length between the detector and the label.

26. The method of claim 25, further comprising the step of measuring the height of the package, said adjusting step being responsive to the height of the package.

27. The method of claim 26, further comprising the step of:

conveying a sequence of packages through a light beam, each of said packages having a label affixed thereon; and wherein said adjusting step comprises adjusting said first and second movable mirrors to maintain said optical path length relatively constant despite differences in the height of said packages.

* * * * *